3,397,393
Patented Aug. 13, 1968

3,397,393

CAPACITOR READ-ONLY MEMORY WITH PLURAL INFORMATION AND GROUND PLANES

Paul H. Palmateer, Wappingers Falls, and Wilbur D. Pricer, Pleasant Valley, N.Y., assignors to International Business Machines Corporation, Armonk, N.Y., a corporation of New York Filed Aug. 10, 1965, Ser. No. 478,558
11 Claims. (Cl. 340—173)

This invention relates to a capacitor read-only memory, and particularly to a capacitor read-only memory construction in which the various elements are arranged in planes and the planes are multi-laminated together.

Data processing machines such as electronic computers and the like have made good use of storage devices known as capacitor read-only memories. That is, information storage devices of the capacitor read-only type are known in the art. This invention relates to the construction of a capaictor read-only information storage device and more specifically to a permanently laminated capacitor read-only memory with a symmetrical electrical and laminate arrangement to vastly reduce ground noise.

In the known prior art capacitor read-only storage systems, word and sense lines are arranged in rows and columns with means for varying the capacitive coupling to provide a capacitance having one or the other of two values at selected grid locations defined by crossings of the rows and columns. The capacitive coupling could be varied by cutting out holes in a dielectric at selected row and column intersections, or inserting a material having a different dielectric constant at row and column intersections, or by varying the area of the capacitor electrodes with a constant dielectric to furnish variable capacity at selected locations. Furthermore, these known capacitor read-only memories have been assembled and held together by mechanically applied pressure means such as screws and nuts and mechanical clamps and pressure plates so that the memory can be quickly taken apart and the permanent information stored therein. However, when taking an assembled laminated memory apart there is the danger that specks of dust and the like will get between the capacitor electrodes disastrously varying the capacitance and the value of the memory.

This invention provides a capacitor read-only memory construction, including an assembly of the usual word and sense lines, an information plane and means for making external connections, in which the assembly is permanently laminated together. This provides a permanent card adapted to be easily inserted in a data processing machine. The permanent lamination is accomplished by placing a partially impregnated laminate between two printed circuits and continuing to build up an assembly of such components to provide the structure desired. After the assembly is stacked up and aligned with appropriate registration holes in the laminate, it is subjected to heat and pressure sufficient to bond the entire assembly together. The particular securing laminates used determine he exact heat and pressure required.

This invention also provides a construction which greatly reduces ground plane noise. Ground plane noise, at the signal levels currently used in data processing, can be so bad as to cause the memory to be unusable. By providing a symmetrical arrangement of the electrical circuits of the capacitive read-only memory, this ground plane noise can be substantially eliminated by forcing it to appear as a mirror image on symmetrical sense lines. This symmetrical arrangement is accomplished by having the word plane in the center of the laminate separated from a pair of symmetrical sense planes on opposite sides of the word planes by a pair of mirror image information planes which have been selectively etched away. Various information planes can be stocked and quickly made and new read-only memories can be quickly laminated, thereby eliminating valuable lead time in manufacturing.

The foregoing and other objects, features and advantages of the invention will be apparent from the following more particular description of a preferred embodiment of the invention, as illustrated in the accompanying drawings.

FIG. 1 is a side elevation view of the capacitor read-only memory of this invention with appropriate base, input, output, components, leads and the like;

Figure 1:
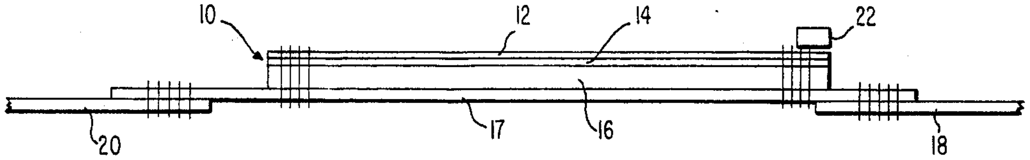

Referring to the drawings, a laminated read-only memory assembly 10 is shown in FIG. 1 as including two memory arrays, 12 and 14. These memory arrays are electrically complete in themselves but may be laminated together to form one memory assembly for the purpose of providing more information storage in the space available.

The capacitor read-only memory assembly 10 may be in selective electrical contact with a pluggable contact area 16, below which is a base card 17. The base card in turn is in electrical contact with circuit cards 18 and 20 which may lead to the input and output circuits. A few selective connections between these cards and pluggable areas are shown in FIG. 1 as is a pluggable resistor pac 22 providing a termination.

Figure 2:
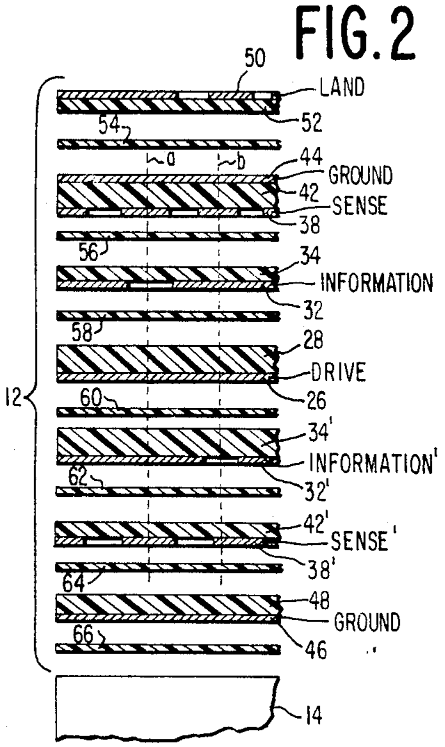
FIG. 2 is an exploded sectional view of the components of the laminated read-only memory.
Figure 3:
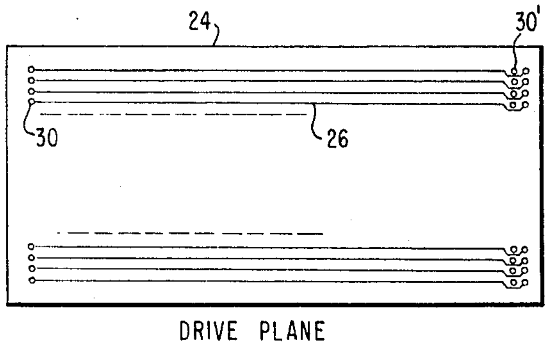
FIG. 3 is a plan view of a word plane.

Referring to FIG. 2, the laminated top array 12 is shown in section and in exploded view. In the center of the assembly is a drive plane 24 including a plurality of drive or word lines 26 which are arranged in rows as shown in the plan view of FIG. 3 showing the drive plane. The drive plane also includes a dielectric base 28. Suitable holes 30 may be provided at the end of the drive lines 26 and they are conductively lined to allow for the input and output connections. The drive lines 26 jog around another row of holes 30' which are utilized for drive lines of the other array 14, and allow extra connections to be made in the same general contact area.

As can be seen in FIG. 2, the drive lines 26 are symmetrical with respect to the laminated assembly. The drive lines are sandwiched between information planes 32 and 32' which have thereon selectively etched areas 33 and 33' removed. Each of the information planes includes a dielectric base 34 and 34'. The removed areas 33 on information plane 32 are a mirror image of the removed areas 33' on plane 32'. Whether or not the conductive material on information planes 32 and 32' are removed at the grid intersections of the drive and sense lines such as at areas 33 and 33' determines whether or not there will be a capactive coupling between the drive and sense lines at any given intersections, see FIG. 8.

Figure 4:
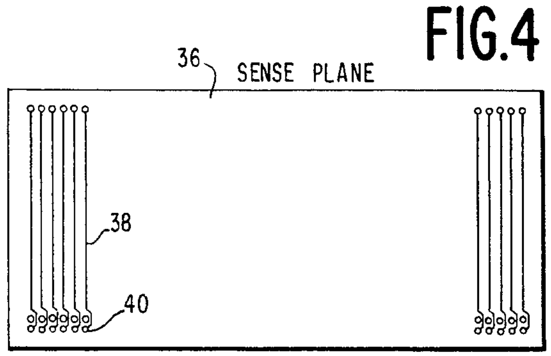
FIG. 4 is a plan view of a sense plane.
Figure 5:
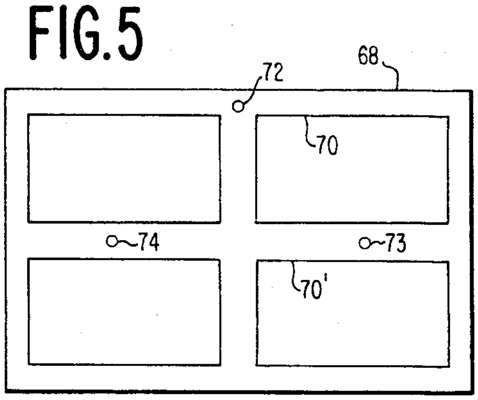
FIG. 5 is a plan view of a laminate during construction.
Figure 8:
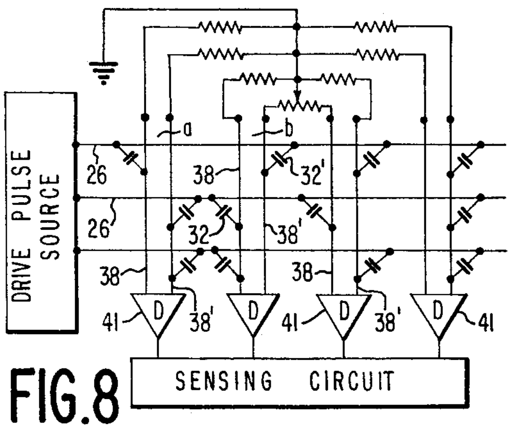
FIG. 8 is an electrical diagram of the capacitor read-only memory showing the symmetrical electrical circuit.

The sense lines are contained on sense planes 36 and 36', which in turn are outside of the information planes 32 and 32' and are separated therefrom by a constant thickness of dielectric material. The sense planes 36, 36' include parallel sense lines 38, 38' respectively, and as shown in FIG. 4 the sense lines extend across the information area in columnar fashion. Of course the columnar sense lines of the sense plane will cross the rows of drive lines of the drive plane at a plurality of grid locations. The sense lines 38, 38' will terminate in conductively lined holes 40, FIG. 4 to provide the electrical connections and are formed as etched or printed circuits on a suitable dielectric base such as base 42 and 42'. The sense lines 38 and 38' are electrically connected together as shown in FIG. 8 and symmetrically terminated.

At any selected grid location where a sense line 38 crosses a drive line 26 there will either be a capacitive coupling due to a removed or etched out intersection on information plane such as intersection 33 or the information plane will not be etched out and the conductive material will provide a shield preventing capacitive coupling. The information planes thus contain the permanent information to be stored in the memory and may read out any time that such information is needed. For example, at grid location *a* shown in FIGS. 2 and 8 there will be a capacitor coupling between drive line 26 and sense line 38 but sense line 38' will have a shield between it and drive line 26 at grid location *a*. This will produce a difference in capacitance sensed in lines 38 and 38' and this difference is detected and amplified by difference amplifier 41, FIG. 8, and sense by the sensing circuit as a binary "0," for example. Similarly, but in an opposite sense, at grid location *b* there will be a capacitive coupling between drive line 26 and sense line 38' but none between drive line 26 and sense line 38. This can be detected by the difference amplifier and sensed by the sensing circuit as a "1."

In addition to the above described components, there are also ground planes 44 and 46 with ground plane 44 on the dielectric base 42 and ground plane 46 on dielectric base 48. There is further a land plane 50 for making selective electrical connections which is on a dielectric base 52. The ground planes 44 and 46 are electrically connected together to provide a symmetrical ground.

In the known prior capacitor read-only memories an assembly including drive, sense and information planes was temporarily held together so that the information planes could be selectivey interchanged. The capacitance of the information planes is quite sensitive to the distance between electrodes, the choice of dielectric, presence of dust and possible misregistration. Changing any information planes any dust in between the planes will cause problems affecting the reliability of the memory. By way of contrast, in the present invention all of the various planes of the array are laminated together in a permanent assembly using laminating sheets. Each of the dielectrics supporting the various conductors of the various planes may be suitably an epoxy resin bonded fiberglass board. These planes are laminated together with preimpregnated epoxy-fiberglass board which is only partially cured and heat treated and, therefore, on further heat and pressure it will adhesively secure and laminate sheets on both sides of it. As shown in FIG. 2 there are a number of partially cured preimpregnated laminating sheets, such as sheets 54, 56, 58, 60, 62 and 64 for laminating together the components of array 12. In addition, partially cured preimpregnated sheet 66 is used to laminate array 12 to an identical array 14.

In making the assembly the capacitive read-only memories may be made from larger laminate sheets such as sheets 68 containing a plurality of etched and identical patterns 70 and 70', etc. These sheets and the partially cured preimpregnated laminating sheets are assembled together in a stack in the order shown in FIG. 2 over suitable registration pins extending through registration holes 72, 73 and 74. The assembly is then placed in a laminating press and permanently laminated together by the use of heat and pressure as is known in the art. In other words, the amount of heat and pressure and the laminating techniques may vary with the laminates being used, the essential features of this invention being the symmetrical arrangement of the drive plane in the center of the assembly sandwiched between information and sense planes to eliminate ground plane noise, together with the permanent lamination and bonding of the assembly together.

Since the drive and sense lines are the same for all planes, only the information planes being varied, the drive and sense planes may be stockpiled, thus contributing to automated production and to short lead time in production. The information planes may be made in a very short time by making a storage pattern negative which can even be generated in minutes by blacking out undesired holes on a master negative with any suitable blackening means. Also, special information patterns on the information planes may be made in the field by painting over any undesired holes in a master etched board with conductive paint and then laminating the assembly together.

Figure 6:
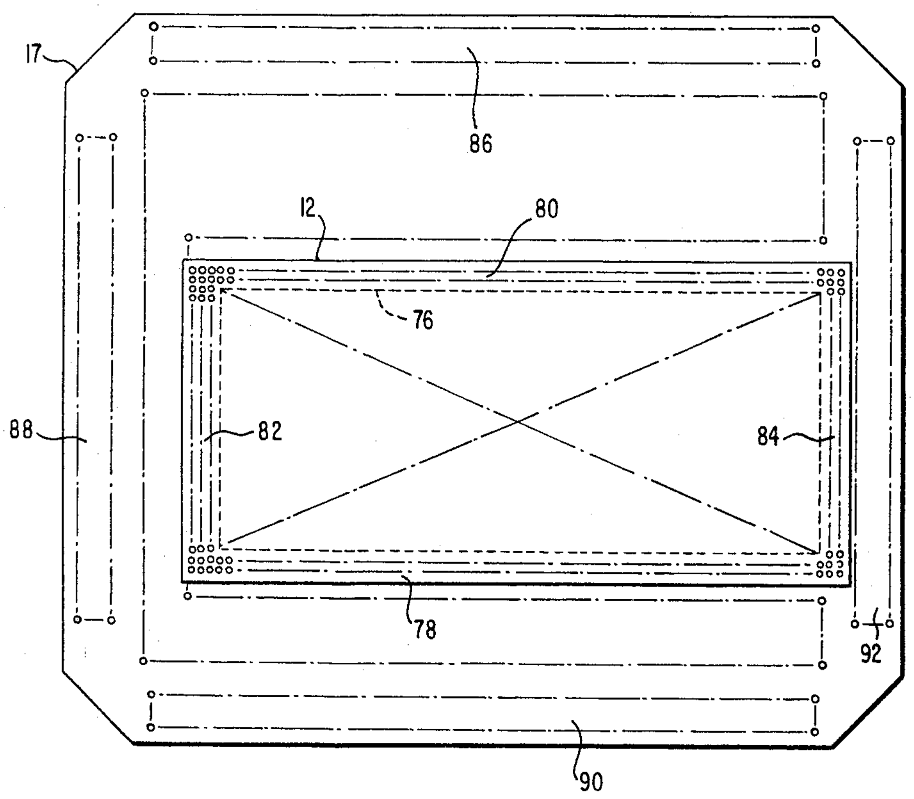
FIG. 6 is a plan view of a plane showing an information area and areas for other purposes.
Figure 7A:
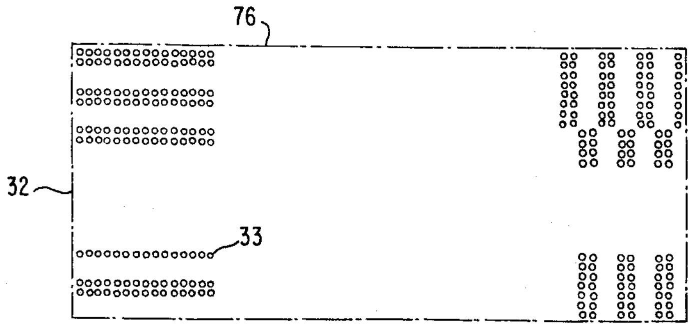
FIG. 7A is a plan view of an information plane.
Figure 7B:
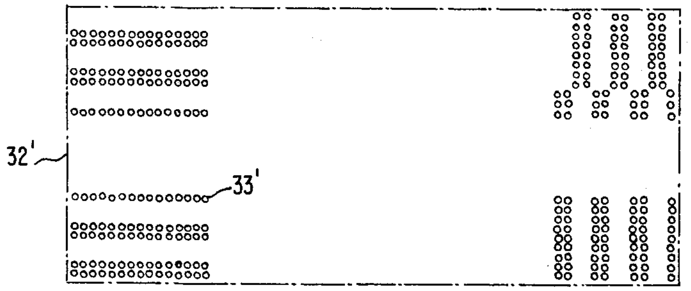
FIG. 7B is a plan view of an information plane which is a mirror image of that shown in FIG. 7A.

FIG. 6 is a top plan view of the arrangement shown in FIG. 1 and illustrates the information area 76 which is the critical part of information planes 32 and 32' shown in FIGS. 7A and 7B, is within a larger rectangular border including four edge areas which may be used for connectors and termination such as areas 78 which is sense line termination from array 12 to 14, area 80 which may be sense line termination to base card 17. Area 84 is for the connections from the word line to the base card and area 82 is for the word line and ground termination to the base card. In addition, the base card 17 may have a plurality of input output areas such as areas 86, 88, 90 and 92. All of these areas have conductively lined holes selectively connected by pluggable connectors. This pluggability is another important feature of the invention, as a finished assembly may be substituted for another in less than a minute and the user is able to alter his machine at will, for example, from scientific to business use with the aid of a library of such arrays.

FIG. 8 is an electrical circuit diagram illustrating the symmetrical electrical circuit for the purpose of reducing ground plane noise. In operation, the rows from top to bottom store the binary words 1000, 0110, 0100, made possible by the selective etching away or leaving shielding metal in information planes 32, 32' at the selected grid intersections of drive lines 26 and sense lines 38, 38' (and using the designation of 0 and 1 as set out above). A pulse on upper drive line 26 will cause the difference amplifier 41 to detect and amplify signals representing the information stored on the top row. Ground plane noise will be greatly reduced due to the symmetrical electrical arrangement.

In making the assembly of this invention the drive and sense lines may be automatically produced and epoxy glass copper clad stock cut to size with registration holes 72, 73 and 74 punched therein, the material is then etched to provide the desired circuits. The same arrangement can be used for the storage pattern of the information planes 32 and 32' and these may be stockpiled. Various selected patterns can be required by just blocking locations in the art work, thus planes and storage patterns can become "off the shelf" items. Lamination is accomplished by placing the assembly of FIG. 2, including the preimpregnated laminates in a laminating fixture with pins extending through holes 72, 73 and 74. The top of the fixture is placed over a laid up structure and the unit is placed in a laminating press and under heat, pressure and a timed cycle the uncured epoxy of the sheets 54, 56, 58, 60, 62, 64 and 66 flows and bonds all circuit planes together. After the unit is removed from the laminating press, it may be drilled as required around the information area 76, for example, in areas 78, 80, 82 and 84 to connect selected lines leading to these holes, for example, lines 26 and 38. The drilled holes are then electroplated by any suitable known process. If desired, knife contacts may be soldered to the sides of the array.

The multilaminated read-only capacitive memory construction of this invention has a number of advantages which may be apparent from the foregoing. These include the ease of automated production and the short lead time, the inexpensive construction and the lack of any limitation on size (as the laminates may be as large in area as the laminating press), the pluggability of the assembly and the uniformity and stability. The geometry is relatively insensitive to misregistration, dielectric instability and stock thickness tolerance. For example, there may be a misregistration of 13 mils on the sense lines or 13 mils on the word lines without producing a degradation of signal of 10 percent.

The symmetrical laminate which facilitates joining of ground planes provides a symmetrical arrangement about drive line 26 and vastly reduces the ground noise as seen by difference type sense amplifier 41 connected to sense lines 38, 38′ by forcing such noise to appear as a mirror image on both sense lines. The information planes are also symmetrically grounded. This feature is exceptionally important because the sense current and the ground plane current differ by more than three orders of magnitude and without this symmetrical arrangement using the order of signal amplitude desired, the ground noise is so bad as to cause the memory to be unworkable and unreliable.

While the invention has been particularly shown and described with reference to a preferred embodiment thereof, it will be understood by those skilled in the art that various changes in form and details may be made therein without departing from the spirit and scope of the invention.

What is claimed is:

1. A capacitor read-only memory comprising:

(a) a drive plane including a plurality of drive lines thereon, (b) a pair of identical sense planes sandwiching the drive plane but spaced therefrom, and a plurality of sense lines on each sense plane positioned to intersect without physically contacting the drive lines to create a plurality of intersections capable of providing a capacitive coupling, (c) a pair of information planes, each positioned between the drive plane and one of the sense planes, one information plane carrying means for permanently but selectively varying the capacitive coupling for each of the intersections, and the other information plane carrying similar means arranged as a mirror image of that on the first information plane, (d) symmetrical ground planes positioned on opposite sides of the drive plane, and (e) means permanently laminating all of the aforesaid planes together.

2. A capacitor read-only memory as defined in claim 1 further comprising means for detecting the difference in signal appearing on a pair of sense lines from the pair of sense planes.

3. A capacitor read-only memory as defined in claim 1 wherein the means permanently laminating all the planes together includes partially preimpregnated sheets of laminate capable of forming a permanent bond with the planes upon the application of heat and pressure.

4. A capacitor read-only memory as defined in claim 3 wherein the ground planes are laminated in the memory on the outside of the sense planes.

5. A capacitor read-only memory as defined in claim 4 wherein connections are made from plane to plane selectively through conductively lined through holes.

6. A capacitor read-only memory as defined in claim 5 further including a pluggable contact area mounting the memory and input and output circuit cards.

7. A capacitor read-only memory as defined in claim 5 wherein there are at least two through holes adjacent the ends of the drive and sense lines one hole being the termination of each line and the line jogging around the other hole.

8. A capacitor ready-only memory comprising:

(a) a drive plane including a plurality of drive lines thereon, (b) a pair of identical sense planes sandwiching the drive plane but spaced therefrom, and a plurality of sense lines on each sense plane positioned to intersect without physically contacting the drive lines to create a plurality of intersections capable of providing a capactive coupling, (c) a pair of information planes, each positioned between the drive plane and one of the sense planes, one information plane carrying means for permanently but selectively varying the capacitive coupling for each of the intersections, and the other information plane carrying similar means arranged as a mirror image of that on the first information plane, (d) symmetrical ground planes positioned on opposite sides of the drive plane, (e) means electrically connecting the sense planes together, the ground planes together, and the connected sense planes to the ground planes, and (f) a difference amplifier for each pair of sense lines on the sense planes.

9. A capacitor read-only memory as defined in claim 8 further comprising partially cured preimpregnated sheets of dielectric material for permanently laminating together all of the aforesaid planes.

10. A capacitor read-only memory of the type including a drive plane with drive conductors thereon, a sense plane, with sense conductors thereon providing a plurality of intersections with the drive conductors, and an information plane providing a known capacity between each intersection of conductors in the word and sense planes, the improvements comprising; a duplicate information plane constructed as a mirror image of the other information plane and permanently laminated together with all other planes and with a second sense plane, the second sense plane sandwiches the second information plane between it and the word plane so that the word plane is in between adjacent information planes, with the sense planes on the outside of the information planes, to provide a permanently laminated assembly with a minimum of ground plane noise.

11. A capacitor read-only memory comprising:

(a) a drive plane including a plurality of drive lines thereon, (b) a sense plane parallel to but spaced from the drive plane, the sense plane having a plurality of sense lines thereon positioned to intersect without physically contacting the drive lines to create a plurality of intersections capable of providing a capacitive coupling.

(c) an information plane positioned between the drive plane and the sense plane, the information plane carrying means for permanently but selectively varying the capacitive coupling at each of the intersections, (d) symmetrical ground planes positioned on opposite sides of the drive plane, and (e) means permanently laminating all of the aforesaid planes together.

References Cited

UNITED STATES PATENTS

| | | | |
|---|---|---|---|
| 3,003,143 | 10/1961 | Beurrier | 340—173 |
| 3,118,133 | 1/1964 | Meeker | 340—173 |
| 3,245,054 | 4/1966 | Byron | 340—173 |

TERRELL W. FEARS, *Primary Examiner.*